(12) United States Patent
Lee et al.

(10) Patent No.: US 10,730,143 B2
(45) Date of Patent: Aug. 4, 2020

(54) LASER WELDING DEVICE

(71) Applicants: HYUNDAI MOTOR COMPANY, Seoul (KR); KIA MOTORS CORPORATION, Seoul (KR)

(72) Inventors: Hanjong Lee, Suwon-si (KR); Chaewon Lim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 343 days.

(21) Appl. No.: 15/820,774

(22) Filed: Nov. 22, 2017

(65) Prior Publication Data

US 2018/0257175 A1    Sep. 13, 2018

(30) Foreign Application Priority Data

Mar. 7, 2017   (KR) .................. 10-2017-0028815

(51) Int. Cl.
*B23K 26/22* (2006.01)
*B23K 26/70* (2014.01)
*B23K 26/082* (2014.01)
*B23K 26/035* (2014.01)

(52) U.S. Cl.
CPC ............ *B23K 26/22* (2013.01); *B23K 26/037* (2015.10); *B23K 26/082* (2015.10); *B23K 26/706* (2015.10)

(58) Field of Classification Search
CPC ...... B23K 26/22; B23K 26/037; B23K 26/08; B23K 26/082; B23K 26/702; B23K 26/706; B23K 26/21; B23K 26/20
See application file for complete search history.

(56) References Cited

U.S. PATENT DOCUMENTS

| 9,114,477 | B2 | | 8/2015 | Haschke et al. | |
|---|---|---|---|---|---|
| 9,314,874 | B2 | * | 4/2016 | Kessler | B23K 26/0869 |
| 9,744,622 | B2 | * | 8/2017 | Huonker | B23K 26/127 |
| 10,293,432 | B2 | * | 5/2019 | Fomin | B23K 26/705 |

FOREIGN PATENT DOCUMENTS

| JP | 2009018326 | 1/2009 |
|---|---|---|
| JP | 2010105015 | 5/2010 |

* cited by examiner

*Primary Examiner* — Nicholas J. Weiss
(74) *Attorney, Agent, or Firm* — Lempia Summerfield Katz LLC

(57) ABSTRACT

A laser welding device includes: a gun body mounted on a front end portion of an arm of a robot; a laser scanner installed on the gun body; a shielding gun fixed to the gun body in a first direction and shielding a laser beam irradiated from the laser scanner; and a pressing gun installed at the gun body to move in the first direction or in a second direction perpendicular to the first direction.

19 Claims, 6 Drawing Sheets

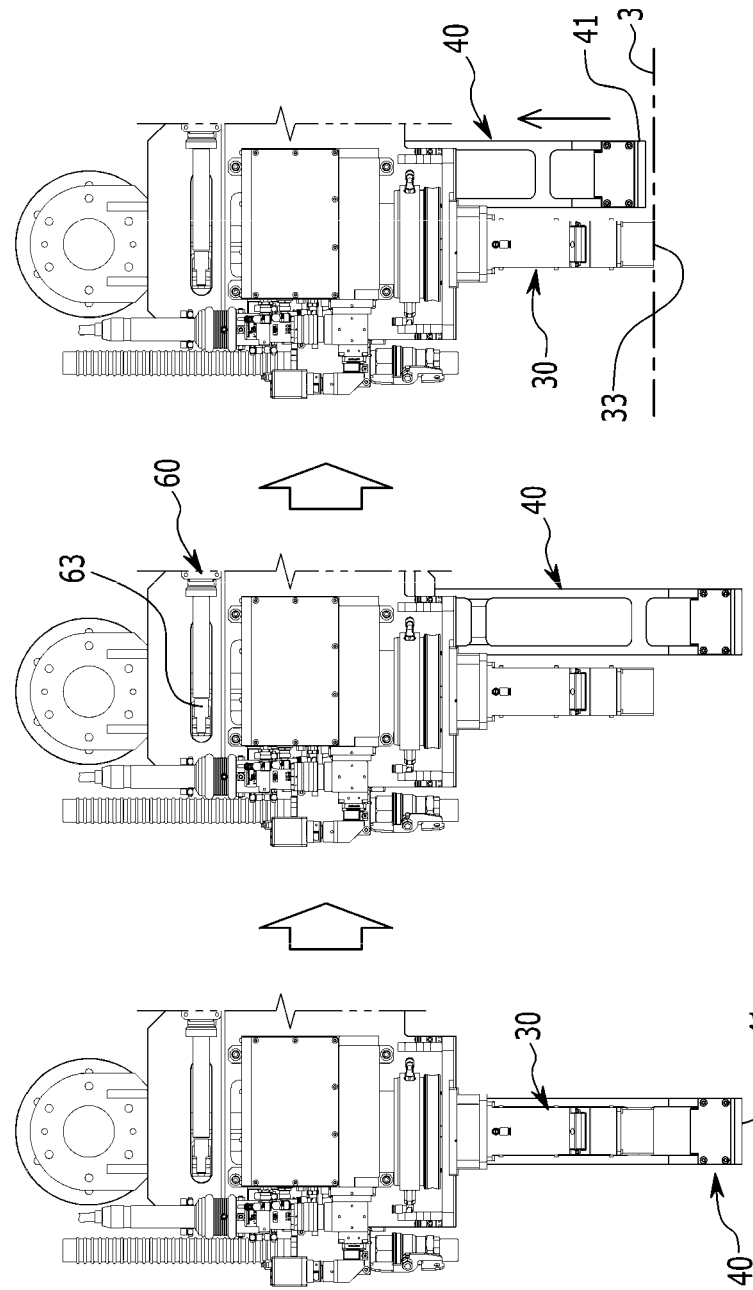

LASER WELDING DEVICE

CROSS-REFERENCE TO RELATED APPLICATION

This application claims priority to and the benefit of Korean Patent Application No. 10-2017-0028815 filed in the Korean Intellectual Property Office on Mar. 7, 2017, the entire contents of which are incorporated herein by reference.

BACKGROUND

(a) Field of the Disclosure

The present disclosure relates to a laser welding device, and more particularly, to a laser welding device capable of laser-welding a welding object by irradiating a laser beam.

(b) Description of the Related Art

Generally, a welding line in a mass production line of vehicles is a big part of the assembly process of a vehicle body. Automation of a welding process has been carried out using a robot system, various jig devices, and a carrying truck system.

Spot resistance welding is mainly used as a method of welding a welding object such as a vehicle body panel. Spot resistance welding is an electric resistance welding method in which an object to be welded is welded by heat produced from electric resistance by applying pressure to a surface of the welding object so that current flows to the welding object.

A spot welding device for spot resistance welding may be a bidirectional spot welding device having a movable electrode body for pressing a welding object and a fixed electrode body. A spot welding device for spot resistance welding may also be a unidirectional spot welding device having a single electrode body.

Recently, a laser welding technique, which uses a laser welding device for welding a vehicle body panel by irradiating a laser beam, has been proposed as a technique for welding a vehicle body panel. The laser welding device includes a laser oscillator for generating the laser beam. The laser welding device also includes a laser head for focusing the laser beam emitted from the laser oscillator and irradiating the laser beam to an object to be welded.

In a related art, it is impossible to change a mode of the laser welding device to a pressing mode or a single direction mode when laser welding is performed by the laser welding device for the welding object of a vehicle body, which has sections of various shapes.

For example, in the case of laser-welding a door opening portion requiring a correction of a gap and a step (e.g., a height difference) in the pressing mode, the laser welding device supports the welding portion with a fixed gun, presses the welding portion with a movable gun, and irradiates the laser beam to the welding portion using the laser head included in the movable gun.

When the door opening portion is welded and then a cowl side upper portion having a cross section of a closed section is laser-welded by the laser welding device in the single direction mode, the laser welding device separates the fixed gun, presses one side of the welding portion with the movable gun, and irradiates the laser beam to the welding portion using the laser head included in the movable gun.

The above information disclosed in this Background section is only for enhancing the understanding of the background of the disclosure. Therefore, the Background section may contain information that does not form the prior art that is already known in this country to a person of ordinary skill in the art.

SUMMARY

The present disclosure is made in an effort to provide a laser welding device that is capable of automatically changing a mode of the laser welding device to a pressing mode or a single direction mode according to the requirements of various welding sections of a welding object.

An embodiment of the present disclosure may provide a laser welding device, including: a gun body mounted on a front end portion of an arm of a robot; a laser scanner installed on the gun body; a shielding gun fixed to the gun body in a first direction and shielding a laser beam irradiated from the laser scanner; and a pressing gun installed at the gun body to move in the first direction or in a second direction perpendicular to the first direction.

The shielding gun may include a support end supporting one side of a welding portion and a guide passage guiding the laser beam.

The shielding gun may have a width in the second direction and may be disposed lengthwise in the first direction.

The shielding gun may include a first portion connected to the laser scanner and a second portion that is connected to the first portion and forms the support end. The second portion may be connected to the first portion in a stepped manner.

The second portion may have a cross-sectional area of the guide passage that is less than a cross-sectional area of the guide passage of the first portion.

The pressing gun may include a pressing portion corresponding to the support end of the shielding gun and supporting the other side of the welding portion. The pressing gun may also include a connecting portion that is disposed in parallel with the shielding gun, is integrally connected to the pressing portion, and is connected to the gun body.

A pressing case may be fixed to the pressing portion in the first direction.

A pressing end pressing the other side of the welding portion may be formed in the pressing case.

The pressing end may be formed to protrude with a width corresponding to the support end of the shielding gun.

The pressing case may include an opening in the pressing end and an internal space connected to the opening.

The laser welding device may further include a moving body installed at the gun body to slide in the second direction and coupled to the pressing gun so that the pressing gun slides in the first direction. The laser welding device may also include a first driving source connected to the moving body and applying a forward and backward moving force to the moving body in the second direction. The laser welding device may also include a second driving source installed at the moving body and applying a forward and backward moving force to the pressing gun so that the pressing gun moves in the first direction.

The moving body may be slidably coupled to at least one first guide rail disposed in the second direction of the gun body.

The pressing gun may be slidably coupled to a second guide rail disposed in the first direction of the moving body.

The first driving source may be fixed to the gun body and may include a first operating cylinder having an operating rod connected to the moving body.

The second driving source may be fixed to the moving body and may include a second operating cylinder having a working rod connected to the pressing gun through a coupling block.

Another embodiment of the present disclosure may provide a laser welding device, including: a gun body mounted on a front end portion of an arm of a robot; a laser scanner installed on the gun body; a shielding gun fixed to the gun body in up and down directions and shielding a laser beam irradiated from the laser scanner; and a pressing gun installed at the gun body to move in the up and down directions or in left and right directions. In a pressing mode, the shielding gun may support one side of a welding portion and the pressing gun may move in an upward direction to press the other side of the welding portion. In a single direction mode, the shielding gun may press one side of the welding portion and the pressing gun may move in a lateral direction and in an upward direction.

The shielding gun may press one side of the welding portion by a movement of the robot in the single direction mode.

The pressing gun may move in an upward direction so that the pressing gun is positioned higher than a support end of the shielding gun in the single direction mode.

The laser welding device may further include a moving body installed at the gun body to slide in the second direction and coupled to the pressing gun so that the pressing gun slides in the up and down directions. The laser welding device may also include a first driving source connected to the moving body and applying a forward and backward moving force to the moving body in the left and right directions. The laser welding device may also include a second driving source installed at the moving body and applying a forward and backward moving force to the pressing gun so that the pressing gun moves in the up and down directions.

The moving body may be slidably coupled to at least one first guide rail disposed in the left and right directions of the gun body.

The pressing gun may be slidably coupled to a second guide rail disposed in the up and down directions of the moving body.

The first driving source may include a first operating cylinder and the second driving source may include a second operating cylinder.

The laser welding device may laser weld by pressing a door opening portion requiring a correction of a gap and a step at both sides by the shielding gun and the pressing gun in the pressing mode.

The laser welding device may laser weld by pressing a cowl side upper portion having a cross section of a closed section at one side by the shielding gun in the single direction mode.

The embodiments of the present disclosure may automatically change the mode of the laser welding device to the pressing mode performed by the shielding gun and the pressing gun or to the single direction mode performed by the shielding gun during welding according to the requirements of various welding sections of the welding object.

However, a related art manually disassembles a pressing gun when the pressing mode is changed to the single direction mode. Therefore, the embodiments of the present disclosure may improve productivity, may shorten the welding cycle time, and may reduce a process area of the laser welding device.

Further, the effects which may be obtained or predicted by the embodiments of the present disclosure are directly or implicitly disclosed in the detailed description of the embodiments of the present disclosure. In other words, various effects which are predicted by the embodiments of the present disclosure are disclosed in the detailed description below.

BRIEF DESCRIPTION OF THE DRAWINGS

While the drawings are described in connection with what are presently considered to be practical embodiments, it is to be understood that the disclosure is not limited to embodiments depicted in the disclosed drawings.

FIGS. 5(a) and 5(b) and FIGS. 6(a)-6(c) are views depicting an operation of the laser welding device according to an embodiment of the present disclosure.

DETAILED DESCRIPTION OF THE EMBODIMENTS

Figure 1:
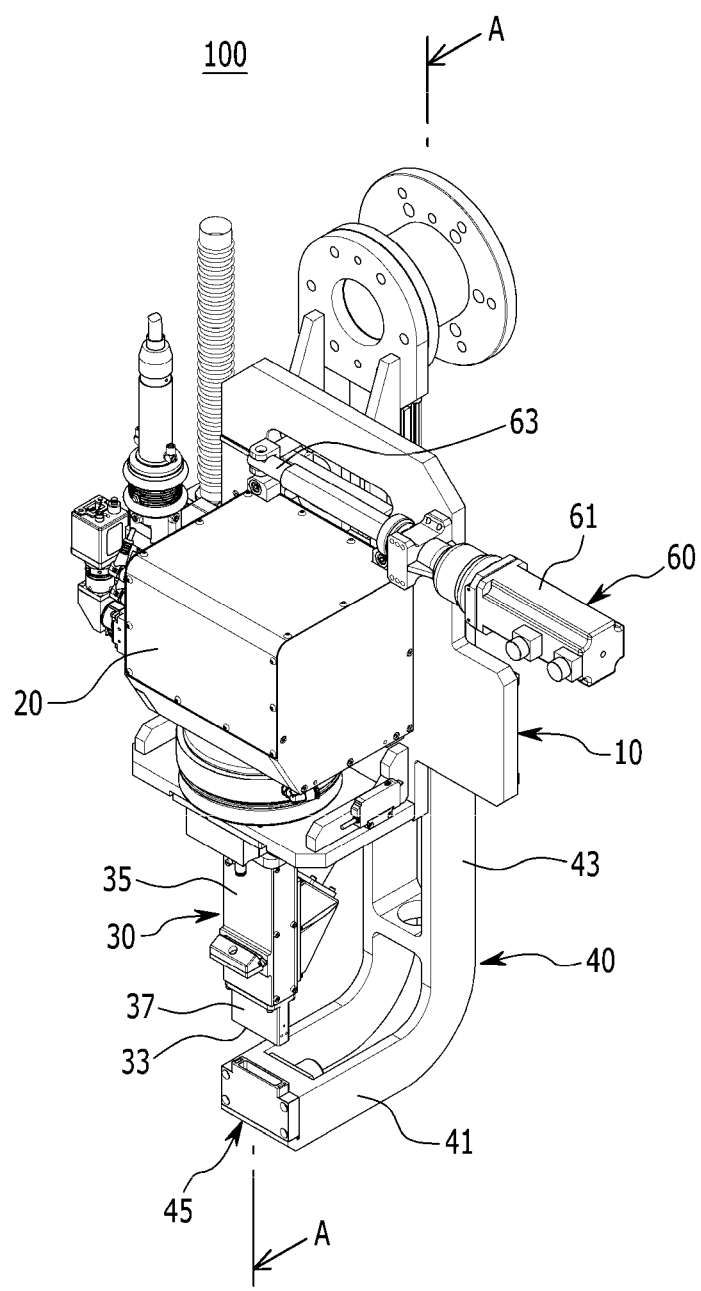
FIGS. 1 and 2 are combined perspective views illustrating a laser welding device according to an embodiment of the present disclosure.

The present disclosure is described more fully hereinafter with reference to the accompanying drawings, in which embodiments of the disclosure are shown. As those having ordinary skill in the art should realize, the described embodiments may be modified in various different ways, all without departing from the spirit or scope of the present disclosure.

Portions having no relation with the description have been omitted in order to explicitly explain the present disclosure. The same reference numerals are used for the same or similar elements throughout the specification and drawings.

The following reference symbols and descriptions are used throughout the drawings and detailed description:

1 . . . welding robot 3 . . . welding object
10 . . . gun body 20 . . . laser scanner
30 . . . shielding gun 31 . . . guide passage
33 . . . support end 35 . . . first portion
36 . . . foreign matter discharge port 37 . . . second portion
40 . . . pressing gun 41 . . . pressing portion
43 . . . connecting portion 45 . . . pressing case
47 . . . pressing end 48 . . . opening
49 . . . internal space 50 . . . moving body
51 . . . first guide rails 53 . . . second guide rail
60 . . . first driving source 61 . . . first operating cylinder
63, 72 . . . operating rod, working rod 70 . . . second driving source
71 . . . second operating cylinder 73 . . . coupling block
LB . . . laser beam In the drawings, the size and thickness of each element is only approximately shown for better understanding and ease of description. Therefore, the present disclosure is not limited to the drawings, and the thicknesses of layers, films, panels, regions, and the like are exaggerated for clarity.

Further, in the following detailed description, names of constituents, which are in the same relationship, are divided into "the first", "the second", and the like, but the present disclosure is not limited to the order, which might otherwise be inferred from such names in the following description.

In the specification, unless explicitly described to the contrary, the word "comprise" and variations such as "comprises" or "comprising", will be understood to imply the inclusion of stated elements but not the exclusion of any other elements.

In addition, the terminology such as " . . . unit", " . . . means", " . . . part", or " . . . member", which is disclosed in the specification, refers to a unit of an inclusive constituent, which performs at least one of the functions or operations.

Figure 2:
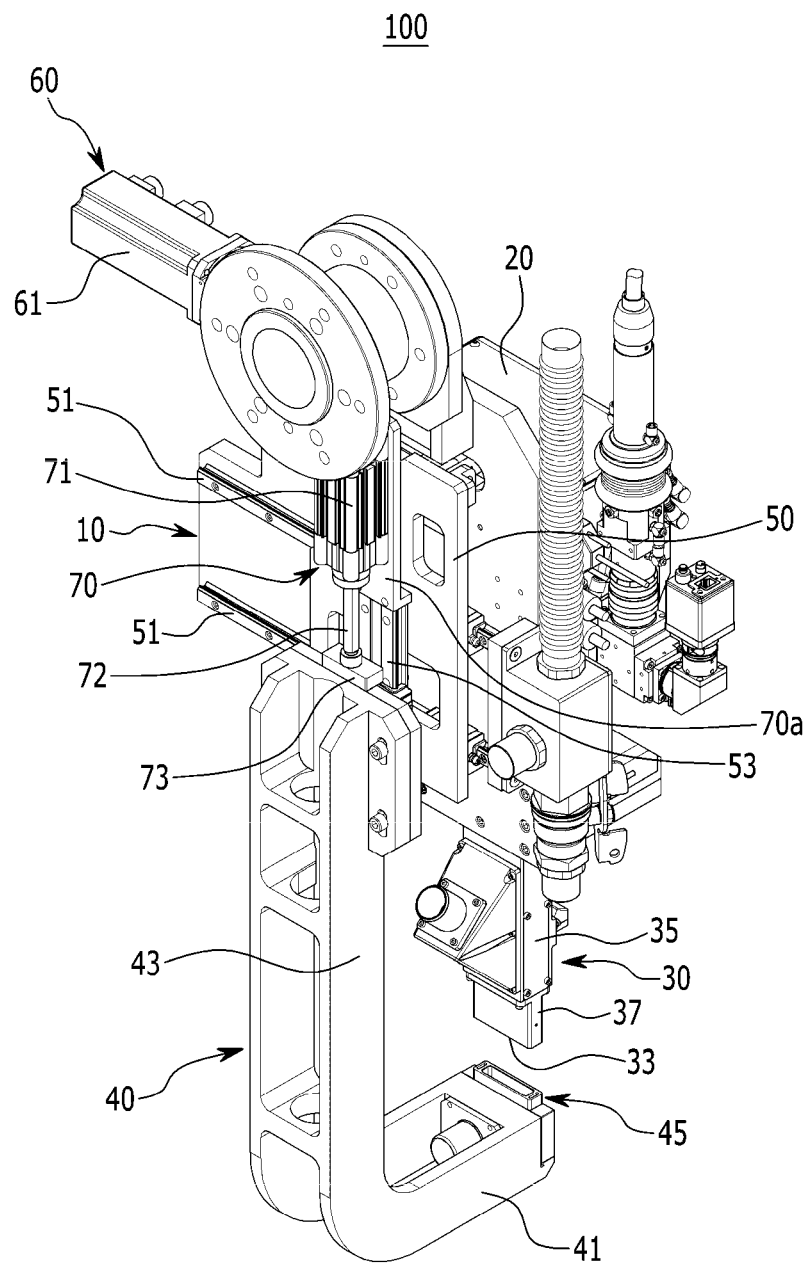
Figure 3:
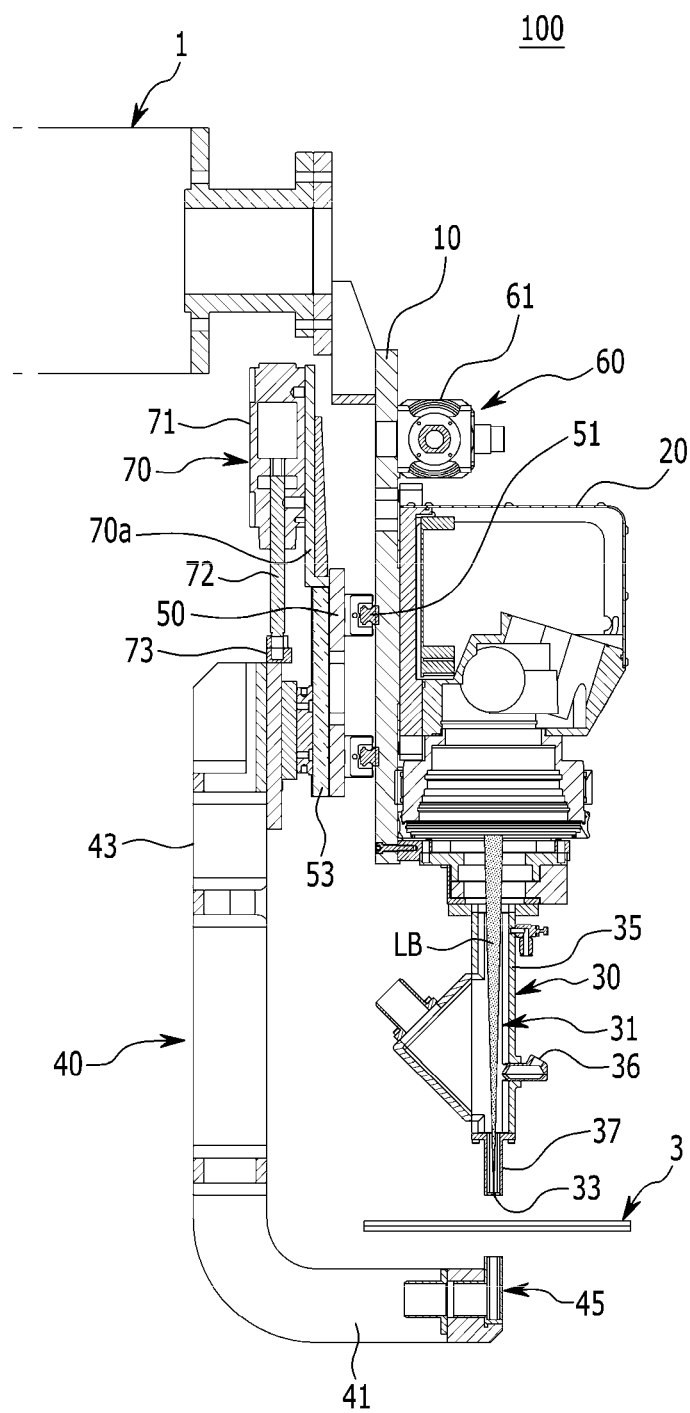
FIG. 3 is a cross-sectional view taken along line A-A of FIG. 1 showing the laser welding device according to an embodiment of the present disclosure.

FIG. 1 and FIG. 2 are perspective views of a laser welding device according to an embodiment of the present disclosure. FIG. 3 is a cross-sectional view taken along line A-A of FIG. 1 showing the laser welding device according to the embodiment of the present disclosure.

Referring to FIGS. 1-3, the laser welding device 100 according to an embodiment of the present disclosure may be applied to a process of joining parts such as a vehicle body panel to a vehicle body by laser welding.

The laser welding device 100 may be referred to as a laser spot welding device because it has a structure similar to that of a resistance spot welding gun and because it spot-welds the parts to the vehicle body using a laser.

The laser welding device 100 may laser-weld a welding portion of a welding object having sections of various shapes. The welding portion may include a door opening portion of a side panel that requires a correction of a gap and a step (e.g., a height difference) and may include a cowl side upper portion having a cross section of a closed section.

Because the welding portion such as the door opening portion of the side panel requires the correction of the gap and the step, bi-directional pressing of the laser welding device 100 with respect to the welding portion may be required. Hereinafter, this case may be referred to as a pressing mode.

Since bi-directional pressing of the laser welding device 100 with respect to the welding portion, such as the cowl side upper portion, is not performed, single direction pressing of the laser welding device with respect to the welding portion may be required. Hereinafter, such a case may be referred to as a single direction mode.

The protective scope of the present disclosure should not be understood to be limited to the laser welding of the welding object for the vehicle body as described above. If the laser welding is applied to a welding object that is used for various kinds of structures and applications, the present disclosure may be applied.

Hereinafter, various components of the laser welding device 100 and a welding process are described with reference to the laser welding device disposed in up and down directions as shown in the drawings.

The definition of the direction may be a relative definition and the direction may be changed according to a reference direction of the welding object and a welding direction of the laser welding device 100. Thus, the direction is not limited to the reference direction of the embodiment of the present disclosure.

The laser welding device 100 may have a structure capable of automatically changing a mode of the laser welding device to the pressing mode or the single direction mode according to the requirements of various welding sections of the welding object.

The laser welding device 100 includes a gun body 10, a laser scanner 20, a shielding gun 30, and a pressing gun 40.

In an embodiment of the present disclosure, the gun body 10 may include a gun frame for installing various elements as described below. For example, the gun body 10 may be mounted on a front end portion of an articulated arm of a welding robot 1.

The gun body 10 includes various sub-elements such as a bracket, a bar, a rod, a plate, a block, a rail, a collar, and the like for supporting elements as described below.

The various sub-elements may install the respective elements in the gun body 10 and may be referred to as the gun body 10.

In an embodiment of the present disclosure, the laser scanner 20 may be fixedly mounted to the gun body 10. The laser scanner 20 includes a laser oscillator for generating a laser beam and a laser head for focusing and irradiating the laser beam emitted from the laser oscillator.

Since a configuration of the laser scanner 20 is configured as a laser oscillator and a laser head of a known technology, which may be well known in the art, a detailed description of the laser scanner configuration has been omitted herein.

In an embodiment of the present disclosure, the shielding gun 30 may shield the laser beam irradiated from the laser scanner 20 to the welding portion of the welding object. The shielding gun 30 may be fixed on the gun body 10 in a first direction (for example, in up and down directions with respect to the drawings).

An upper portion of the shielding gun 30 may be fixed to a lower surface of the gun body 10. In other words, the shielding gun 30 may be disposed lengthwise in a downward direction on the lower surface of the gun body 10. The shielding gun 30 may include a guide passage 31 for guiding the laser beam LB emitted from the laser scanner 20, as shown in FIG. 3. The term "end" in the following description may be defined as either end of an element, and may be defined as a certain portion including the end.

Referring to FIG. 3, the shielding gun 30 may include a support end 33 formed at a lower end thereof for supporting one side of the welding portion of the welding object 3. The support end 33 may be defined as a portion that supports and presses one side (for example, an upper side in FIG. 3) of the welding object 3 by a movement of the welding robot 1 in the pressing mode and the single direction mode of the laser welding device 100.

Specifically, the shielding gun 30 may have a width in another direction (for example, left and right directions in FIG. 3) that is a second direction, may form the guide passage 31 therein, and may be disposed lengthwise in the downward direction on the lower surface of the gun body 10.

The shielding gun 30 includes a first portion 35 connected to the laser scanner 20 and a second portion 37, which is stepped (or with a height difference) relative to and connected to the first portion 35 and forms the support end 33.

The second portion 37 may have a thickness that is less than that of the first portion 35 and a passage cross-sectional area (for example, a cross-sectional area of the guide passage) that is less than that of the first portion 35. The reason why the second portion 37 has a thickness that is less than that of the first portion 35 and the passage cross-sectional area that is less than a passage cross-sectional area of the first portion 35 may be because the support end 33 supports and presses the welding part that is relatively narrow.

Further, the first portion 35 may include a foreign matter discharge port 36 for discharging a hydrocarbon grain generated from the welding portion when the welding object 3 is laser-welded.

Referring to FIGS. 1-3, the pressing gun 40 may press another side (for example, a lower side) of the welding portion below the shielding gun 30 in the pressing mode.

Figure 4:
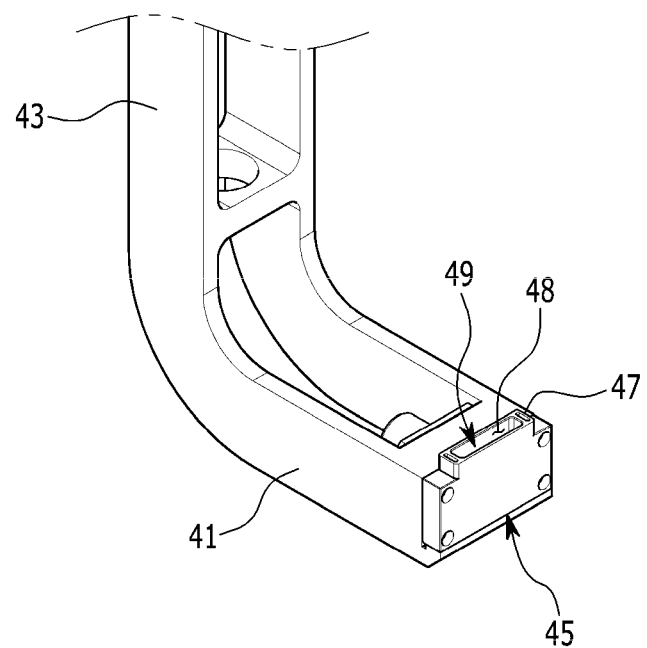
FIG. 4 is a view showing a pressing gun applied to the laser welding device according to an embodiment of the present disclosure.

The pressing gun 40 may have an approximately L shape. As shown in FIG. 4, the pressing gun 40 includes a pressing portion 41 that corresponds to the support end 33 of the shielding gun 30 and that supports the other side of the welding portion. The pressing gun 40 also includes a connecting portion 43, which is disposed in parallel with the shielding gun 30, is integrally connected to the pressing portion 41, and is substantially connected to the gun body 10.

A pressing case 45 may be fixed to an end portion of the pressing portion 41 in up and down directions. A pressing end 47, which substantially presses the other side of the welding portion, may be integrally formed in the pressing case 45. The pressing end 47 may be formed to protrude with a width corresponding to the support end 33 of the shielding gun 30. In other words, the pressing end 47 may be defined as an upper end edge portion of the pressing case 45 protruding greater than an end height of the pressing portion 41.

Furthermore, the pressing case 45 may include an opening 48 in the pressing end 47 and an internal space 49 connected to the opening 48. The reason why the pressing case 45 includes the opening 48 and the internal space 49 may be because the opening and the internal space collect a hydrocarbon grain generated from the welding portion when the welding object 3 is laser-welded.

The pressing gun 40 may be installed at the gun body 10 to move in the first direction (for example, up and down directions with reference to the drawings) or in another direction (for example, left and right directions with reference to the drawings that are the second direction) perpendicular to the up and down directions.

The pressing gun 40 may move in an upward direction to press a lower side of the welding portion in the pressing mode in a state where the support end 33 supports and presses an upper side of the welding portion by the movement of the welding robot 1.

The pressing gun 40 may move in a lateral direction and in an upward direction in the single direction mode so that the support end 33 of the shielding gun 30 supports and presses the upper side of the welding portion by the movement of the welding robot 1.

This embodiment of the present disclosure includes a moving body 50, a first driving source 60, and a second driving source 70 that move the pressing gun 40 in the up and down directions or the left and right directions.

The moving body 50 may have a plate shape and may be installed at the gun body 10 to slide in the right and left directions. The pressing gun 40 may be coupled to the moving body 50 to slide in the up and down directions.

The moving body 50 may be slidably coupled to a pair of first guide rails 51 disposed in the left and right directions of the gun body 10. The pressing gun 40 may be slidably coupled to a single second guide rail 53 disposed in the up and down directions of the moving body 50.

The first driving source 60 may be fixed to the gun body 10, may apply a forward and backward moving force to the moving body 50 to move in the left and right directions, and may include a first operating cylinder 61 connected to the moving body 50. An operating rod 63 of the first operating cylinder 61 may be connected to the moving body 50.

The first driving source 60 may move the moving body 50 in the left and right directions along the first guide rails 51 by operating the operating rod 63 of the first operating cylinder 61 back and forth.

The second driving source 70 may apply a forward and backward moving force to the pressing gun 40 so that the pressing gun 40 moves in the up and down directions and may be fixed to the moving body 50 by a fixing bracket 70a. The second driving source 70 may be fixed to an upper portion of the moving body 50 and may include a second operating cylinder 71 having a working rod 72 connected to the pressing gun 40 through a coupling block 73.

The second drive source 70 may move the pressing gun 40 in the up and down directions along the second guide rail 53 by operating the working rod 72 of the second operating cylinder 71 back and forth.

Hereinafter, an operation of the laser welding device 100 is described in detail with reference to the accompanying drawings.

FIGS. 5(a) and 5(b) and FIGS. 6(a)-(c) are views for explaining the operation of the laser welding device according to an embodiment of the present disclosure.

First, in an embodiment of the present disclosure, the laser welding device 100 may be moved to the welding object 3 of the vehicle body by the welding robot 1. For example, the laser welding device 100 may be moved to the door opening portion of the side panel that is the welding portion of the welding object 3.

In this case, the laser welding device 100 may be set to the pressing mode by a controller (not shown in the drawings) because the correction of the gap and the step of the door opening portion is required by pressing the door opening portion in both directions.

Figures 5A, 5B:
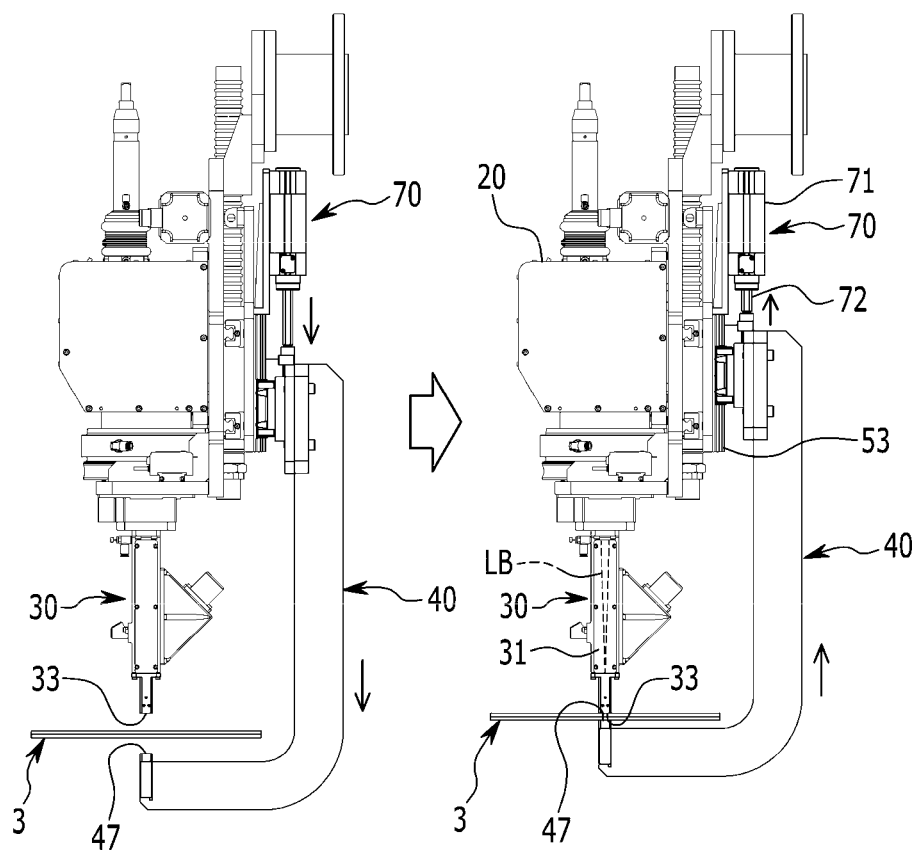

In the pressing mode, as shown in FIG. 5(a), the pressing gun 40 may be positioned to correspond to a position of the shielding gun 30 and may be moved in a downward direction by the second driving source 70. The welding portion of the welding object 3 may be positioned between the support end 33 of the shielding gun 30 and the pressing end 47 of the pressing gun 40. In other words, the welding portion may be located between the support end 33 and the pressing end 47 that are disposed in upper and lower sides.

In this state, as shown in FIG. 5(b), an upper side of the welding portion of the welding object 3 may be pressed by the support end 33 of the shielding gun 30 moved by the welding robot 1. The pressing gun 40 may be moved upward by the second driving source 70. The second driving source 70 may move the pressing gun 40 upward along the second guide rail 53 by moving the working rod 72 of the second operating cylinder 71 backward.

The pressing end 47 of the pressing gun 40 may then press a lower side of the welding portion of the welding object 3. In other words, the support end 33 of the shielding gun 30 and the pressing end 47 of the pressing gun 40 may press the welding portion of the welding object 3 in both directions.

In this state, an embodiment of the present disclosure may guide the laser beam LB emitted from the laser scanner 20 to the welding portion through the guide passage 31 of the shielding gun 30 and may laser-weld the welding portion of the welding object 3 using the laser beam.

Therefore, in the pressing mode, the welding portion of the welding object 3 may be pressed in both directions by the support end 33 and the pressing end 47. The gap and the step of the welding portion may be corrected, and the welding portion may be laser-welded by the laser beam LB.

In a state where welding of the welding portion is completed as described above, the embodiment of the present disclosure may lower the pressing gun 40 and return the pressing gun to the original position using the second driving source 70.

The second driving source 70 may move the pressing gun 40 downward along the second guide rail 53 by advancing the working rod 72 of the second operating cylinder 71.

Thereafter, in an embodiment of the present disclosure, the laser welding device 100 may be moved by the welding robot 1 to another welding portion of the welding object 3. For example, in an embodiment of the present disclosure, the laser welding device 100 may be moved to the cowl side upper portion having the cross section of the closed section.

In this process, the welding portion may not be pressed in both directions. Thus, the laser welding device 100 may be set to the single direction mode by the controller.

When the single direction mode is set in a state where the pressing portion 41 of the pressing gun 40 is positioned below the shielding gun 30, as shown in FIG. 6(a), an embodiment of the present disclosure may move the pressing gun in a lateral direction using the first driving source 60 as shown in FIG. 6(b). The first driving source 60 may move the operating rod 63 of the operating cylinder 61 forward or backward and may move the pressing gun 40 in a lateral direction or in another lateral direction along the first guide rails 51.

Then, in an embodiment of the present disclosure, the pressing gun 40 may be moved upward by the second driving source 70 as shown in FIG. 6(c). The second driving source 70 may move the pressing gun 40 upward along the second guide rail 53 by moving the working rod 72 of the second operating cylinder 71 backward.

In this case, this embodiment of the present disclosure may move the pressing gun 40 upwards to a predetermined height so that the pressing portion 41 of the pressing gun 40 is positioned higher than the support end 33 of the shielding gun 30.

Next, in an embodiment of the present disclosure, an upper side of the welding portion of the welding object 3 may be pressed by the support end 33 of the shielding gun 30 moved by the welding robot 1.

Next, an embodiment of the present disclosure may guide the laser beam LB irradiated from the laser scanner 20 to the welding portion through the guide passage 31 of the shielding gun 30 and may laser-weld the welding portion of the welding object 3 using the laser beam.

Therefore, in the single direction mode, the welding portion of the welding object 3 may be pressed in a single direction only by the support end 33 of the shielding gun 30. The welding portion may be laser-welded by the laser beam LB.

As described above, the laser welding device 100 may automatically change the mode of the laser welding device to the pressing mode performed by the shielding gun 30 and the pressing gun 40 or to the single direction mode performed by the shielding gun during the welding process according to the requirements of various welding sections of the welding object 3.

Therefore, unlike a related art, which requires manually dismantling the pressing gun when the pressing mode is changed to the single direction mode, the embodiments of the present disclosure may improve productivity, may shorten the welding cycle time, and may reduce a process area of the laser welding device 100.

While this disclosure has been described in connection with what are presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A laser welding device comprising:
    a gun body mounted on a front end portion of an arm of a robot;
    a laser scanner installed on the gun body;
    a shielding gun fixed to the gun body in a first direction and shielding a laser beam irradiated from the laser scanner; and
    a pressing gun installed at the gun body and configured to move in the first direction and in a second direction perpendicular to the first direction.

2. The laser welding device of claim 1, wherein the shielding gun includes a support end supporting one side of a welding portion and a guide passage guiding the laser beam.

3. The laser welding device of claim 2, wherein the shielding gun has a width in the second direction and is disposed lengthwise in the first direction,
    wherein the shielding gun includes a first portion connected to the laser scanner and a second portion that is connected to the first portion and forms the support end, and
    wherein the second portion has a cross-sectional area of the guide passage less than a cross-sectional area of the guide passage of the first portion.

4. The laser welding device of claim 3, wherein the second portion is connected in a stepped manner relative to the first portion.

5. The laser welding device of claim 2, wherein the pressing gun comprises:
    a pressing portion corresponding to the support end of the shielding gun and supporting the other side of the welding portion; and
    a connecting portion that is disposed in parallel with the shielding gun, is integrally connected to the pressing portion, and is connected to the gun body.

6. The laser welding device of claim 5, wherein a pressing case is fixed to the pressing portion in the first direction,
    wherein a pressing end pressing the other side of the welding portion is formed in the pressing case, and
    wherein the pressing end is formed to protrude with a width corresponding to the support end of the shielding gun.

7. The laser welding device of claim 6, wherein the pressing case includes an opening in the pressing end and an internal space connected to the opening.

8. The laser welding device of claim 1, further comprising:
    a moving body installed at the gun body to slide in the second direction and coupled to the pressing gun so that the pressing gun slides in the first direction;
    a first driving source connected to the moving body and applying a forward and backward moving force to the moving body in the second direction; and
    a second driving source installed at the moving body and applying a forward and backward moving force to the pressing gun so that the pressing gun moves in the first direction.

9. The laser welding device of claim 8, wherein the moving body is slidably coupled to at least one first guide rail disposed in the second direction of the gun body.

10. The laser welding device of claim 9, wherein the pressing gun is slidably coupled to a second guide rail disposed in the first direction of the moving body.

11. The laser welding device of claim 8, wherein the first driving source is fixed to the gun body and includes a first operating cylinder having an operating rod connected to the moving body.

12. The laser welding device of claim 8, wherein the second driving source is fixed to the moving body and includes a second operating cylinder having a working rod connected to the pressing gun through a coupling block.

13. A laser welding device, comprising:
a gun body mounted on a front end portion of an arm of a robot;
a laser scanner installed on the gun body;
a shielding gun fixed to the gun body in up and down directions and shielding a laser beam irradiated from the laser scanner; and
a pressing gun installed at the gun body to move in the up and down directions or in left and right directions,
wherein, in a pressing mode, the shielding gun supports one side of a welding portion and the pressing gun moves in an upward direction to press the other side of the welding portion, and
wherein, in a single direction mode, the shielding gun presses one side of the welding portion and the pressing gun moves in a lateral direction and in an upward direction.

14. The laser welding device of claim 13, wherein the shielding gun presses one side of the welding portion by a movement of the robot in the single direction mode.

15. The laser welding device of claim 14, wherein the pressing gun moves in an upward direction so that the pressing gun is positioned higher than a support end of the shielding gun in the single direction mode.

16. The laser welding device of claim 13, further comprising:
a moving body installed at the gun body to slide in the second direction and coupled to the pressing gun so that the pressing gun slides in the up and down directions;
a first driving source connected to the moving body and applying a forward and backward moving force to the moving body in the left and right directions; and
a second driving source installed at the moving body and applying a forward and backward moving force to the pressing gun so that the pressing gun moves in the up and down directions.

17. The laser welding device of claim 16, wherein the moving body is slidably coupled to at least one first guide rail disposed in the left and right directions of the gun body, and
wherein the pressing gun is slidably coupled to a second guide rail disposed in the up and down directions of the moving body.

18. The laser welding device of claim 16, wherein the first driving source includes a first operating cylinder and the second driving source includes a second operating cylinder.

19. The laser welding device of claim 13, wherein the laser welding device laser-welds by pressing a door opening portion requiring a correction of a gap and a step at both sides by the shielding gun and the pressing gun in the pressing mode, and
wherein the laser welding device laser-welds by pressing a cowl side upper portion having a cross section of a closed section at one side by the shielding gun in the single direction mode.

\* \* \* \* \*